US009749997B2

(12) United States Patent
Papasakellariou et al.

(10) Patent No.: US 9,749,997 B2
(45) Date of Patent: *Aug. 29, 2017

(54) REPEATING TRANSMISSIONS OF SIGNALS IN COMMUNICATION SYSTEMS

(71) Applicant: Samsung Electronics Co., Ltd., Gyeonggi-do (KR)

(72) Inventors: Aris Papasakellariou, Houston, TX (US); Joon-Young Cho, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 453 days.

This patent is subject to a terminal disclaimer.

(21) Appl. No.: 13/911,722

(22) Filed: Jun. 6, 2013

(65) Prior Publication Data

US 2013/0265970 A1    Oct. 10, 2013

Related U.S. Application Data

(63) Continuation of application No. 12/243,505, filed on Oct. 1, 2008, now Pat. No. 8,488,567.
(Continued)

(51) Int. Cl.
*H04W 72/04* (2009.01)
*H04J 3/00* (2006.01)
(Continued)

(52) U.S. Cl.
CPC ....... *H04W 72/0413* (2013.01); *H04L 1/0055* (2013.01); *H04L 1/0057* (2013.01);
(Continued)

(58) Field of Classification Search
CPC ............. H04W 72/0413; H04L 1/0055; H04L 1/0057; H04L 1/1607; H04L 1/1685;
(Continued)

(56) References Cited

U.S. PATENT DOCUMENTS 7,339,949 B2   3/2008 Suzuki et al.
7,564,827 B2   7/2009 Das et al.
(Continued)

FOREIGN PATENT DOCUMENTS

CN    1941668    4/2007
JP    8154096    6/1996
(Continued)

OTHER PUBLICATIONS

Indian Office Action dated Dec. 22, 2014 issued in counterpart application No. 609/KOLNP/2010.
(Continued)

*Primary Examiner* — Gregory Sefcheck
*Assistant Examiner* — Majid Esmaeilian
(74) *Attorney, Agent, or Firm* — The Farrell Law Firm, P.C.

(57) ABSTRACT

Methods and apparatuses are provided for a User Equipment (UE) to transmit an acknowledgement signal over multiple Transmission Time Intervals (TTIs). The method includes transmitting the acknowledgement signal in $\{(n+Q)^{th}, (n+Q+1)^{th}, \ldots, (n+Q+N-1)^{th}\}$ Transmission Time Intervals (TTIs), the acknowledgement signal corresponding to a data packet the UE receives in an $n^{th}$ TTI; and not transmitting a non-acknowledgement signal in the $\{(n+Q)^{th}, (n+Q+1)^{th}, \ldots, (n+Q+N-1)^{th}\}$ TTIs. n is an integer, Q is a number greater than 0, and N is a number greater than 1.

14 Claims, 15 Drawing Sheets

Related U.S. Application Data

(60) Provisional application No. 60/976,961, filed on Oct. 2, 2007, provisional application No. 61/074,851, filed on Jun. 23, 2008.

(51) Int. Cl.
  *H04L 1/16* (2006.01)
  *H04L 1/18* (2006.01)
  *H04L 5/00* (2006.01)
  *H04L 1/00* (2006.01)
  *H04L 27/26* (2006.01)

(52) U.S. Cl.
  CPC .......... *H04L 1/1607* (2013.01); *H04L 1/1685* (2013.01); *H04L 1/1858* (2013.01); *H04L 1/1887* (2013.01); *H04L 5/0053* (2013.01); *H04L 27/2613* (2013.01); *H04L 27/2607* (2013.01)

(58) Field of Classification Search
  CPC ... H04L 1/1858; H04L 1/1887; H04L 5/0053; H04L 27/2613; H04L 27/2607
  USPC ........................................................ 370/336
  See application file for complete search history.

(56) References Cited

U.S. PATENT DOCUMENTS

| | | |
|---|---|---|
| 7,822,044 B2 | 10/2010 | Lee |
| 7,907,906 B2 | 3/2011 | Murata et al. |
| 8,098,581 B2 | 1/2012 | Tiedemann, Jr. et al. |
| 2002/0122400 A1 | 9/2002 | Vayanos et al. |
| 2003/0067907 A1 | 4/2003 | Rezailfar et al. |
| 2005/0249120 A1 | 11/2005 | Heo et al. |
| 2006/0159061 A1 | 7/2006 | Takano et al. |
| 2007/0150788 A1 | 6/2007 | Zhuyan |
| 2007/0286146 A1 | 12/2007 | Kuroda et al. |
| 2008/0095109 A1 | 4/2008 | Malladi et al. |
| 2010/0008435 A1 | 1/2010 | June et al. |
| 2010/0040037 A1* | 2/2010 | Choi ................. H04W 36/0088 370/345 |
| 2010/0098007 A1* | 4/2010 | Kim ......................... H04L 1/08 370/329 |

FOREIGN PATENT DOCUMENTS

| | | | |
|---|---|---|---|
| JP | 2003143645 | 5/2003 | |
| JP | 2003-179581 | 6/2003 | |
| JP | 2006086551 | 3/2006 | |
| JP | 2007214920 | 8/2007 | |
| JP | 2010503921 | 1/2010 | |
| KR | 1020020045075 | 6/2002 | |
| KR | 1020070051304 | 5/2007 | |
| KR | WO 2008039025 A2 * | 4/2008 | ............ H04L 1/001 |
| RU | 2300175 | 5/2007 | |
| WO | WO 02/096006 | 11/2002 | |
| WO | WO03058873 | 7/2003 | |
| WO | WO2004006613 | 1/2004 | |
| WO | WO2004072673 | 8/2004 | |
| WO | WO2005109724 | 11/2005 | |
| WO | WO2006030313 | 3/2006 | |
| WO | WO 2008028006 A2 * | 3/2008 | ........... H04L 1/0083 |
| WO | WO2008039025 | 4/2008 | |
| WO | WO 2008039025 A2 * | 4/2008 | |

OTHER PUBLICATIONS

Qualcomm Europe, "Support of ACK Repetition for E-UTRA Uplink" R1-073261, 3GPP TSG RAN1 #50, Aug. 15, 2007.
NTT DoCoMo, KDDI, Mitsubishi Electric, NEC, Panasonic, Sharp, "Repetition of ACK/NACK in E-UTRA Uplink", R1-070101, 3GPP TSG RAN WG1 Meeting #47bis, Jan. 10, 2007.
NTT DoCoMo et al., Reptition of ACK/NACK in E-UTRA Uplink.
Samsung, ACK/NACK Repetitions in E-UTRA UL, R1-074098.
Panasonic et al., Joint Way Forward on the Uplink ACK/NACK Reptition for PUCCH.
Samsung, ACK/NAK—Repetitions in E-UTRA UL; R1-082303.
Texas Instruments, et al., Way Forward on Support of ACK/NACK Repetition.

* cited by examiner

REPEATING TRANSMISSIONS OF SIGNALS IN COMMUNICATION SYSTEMS

PRIORITY

The present application is a Continuation application of U.S. patent application Ser. No. 12/243,505, which was filed in the United States Patent and Trademark Office on Oct. 1, 2008, and claims priority under 35 U.S.C. §119(e) to U.S. Provisional Application No. 60/976,961, which was filed in the United States Patent and Trademark Office on Oct. 2, 2007, and to U.S. Provisional Application No. 61/074,851, which was filed in the United States Patent and Trademark Office on Jun. 23, 2008, the entire content of each of which are hereby incorporated by reference.

BACKGROUND OF THE INVENTION

1. Field of the Invention

The present invention is directed, in general, to wireless communication systems and, more specifically, to a Single-Carrier Frequency Division Multiple Access (SC-FDMA) communication system and is further considered in the development of the $3^{rd}$ Generation Partnership Project (3GPP) Evolved Universal Terrestrial Radio Access (E-UTRA) Long Term Evolution (LTE).

In particular, the present invention considers the transmission of positive or Negative ACKnowledgement signals (ACK or NAK, respectively) over multiple transmission time intervals in an SC-FDMA communication system.

2. Description of the Art

Several types of signals should be supported for the proper functionality of a communication system. In addition to data signals, which convey the information content, control signals also need to be transmitted from User Equipments (UEs) to their serving base station (or Node B) in the UpLink (UL) of the communication system and from the serving Node B to UEs in the DownLink (DL) of the communication system in order to enable proper processing of the data. A UE, also commonly referred to as terminal or mobile station, may be fixed or mobile and may be a wireless device, a cellular phone, a personal computer device, a wireless modem card, etc. A Node B is generally a fixed station and may also be called a Base Transceiver System (BTS), an access point, or some other terminology.

The acknowledgement signal, i.e., an ACK or NAK, also known as Hybrid Automatic Repeat reQuest (HARQ)-ACK, is a control signal associated with the application of HARQ and is in response to the data packet reception. A data packet is retransmitted if a NAK is received, and a new data packet may be transmitted if an ACK is received.

The transmission of signals carrying the data information from UEs is assumed to be through a Physical Uplink Shared CHannel (PUSCH). When there is no data, a UE transmits control signals through the Physical Uplink Control CHannel (PUCCH). When there is data, a UE transmits control signals through the PUSCH in order to maintain the single carrier property.

The UEs are assumed to transmit data or control signals over a Transmission Time Interval (TTI) corresponding to a sub-frame. FIG. 1 illustrates a block diagram of a sub-frame structure 110. The sub-frame includes two slots. Each slot 120 further includes seven symbols used for the transmission of data and/or control signals. Each symbol 130 further includes a Cyclic Prefix (CP) in order to mitigate interference due to channel propagation effects. The signal transmission in the first slot may be at the same part, or at a different part of the operating BandWidth (BW) than the signal transmission in the second slot. In addition to symbols carrying data or control signals, some other symbols may be used for the transmission of Reference Signals (RS), which are also referred to as pilots. The RS may be used for several receiver functions, including channel estimation and coherent demodulation of the received signal.

The transmission BW is assumed to include frequency resource units, which will be referred to herein as Resource Blocks (RBs). Herein, each RB is further assumed to include 12 sub-carriers and UEs can be allocated a multiple of P consecutive RBs 140 for PUSCH transmission and 1 RB for PUCCH transmission. Nevertheless, the above values are only illustrative and not restrictive to the embodiments of the invention.

FIG. 2 illustrates a PUCCH structure 210 for the ACK/NAK transmission in one slot of a sub-frame. The transmission in the other slot, which may be at a different part of the operating BW for frequency diversity, is assumed to have the same structure.

The PUCCH ACK/NAK transmission structure 210 includes the transmission of ACK/NAK signals and RS. The RS can be used for the coherent demodulation of the ACK/NAK signals. The ACK/NAK bits 220 modulate 230 a Constant Amplitude Zero Auto-Correlation (CAZAC) sequence 240, for example, with Binary Phase Shift Keying (BPSK) or Quadrature Phase Shift Keying (QPSK) modulation, which is then transmitted by the UE after performing the Inverse Fast Fourier Transform (IFFT) operation as will subsequently described. It is assumed that each RS 250 is transmitted through the same, unmodulated CAZAC sequence.

An example of CAZAC sequences is given by the following Equation (1):

$$c_k(n) = \exp\left[\frac{j2\pi k}{L}\left(n + n\frac{n+1}{2}\right)\right] \quad (1)$$

In Equation (1), L is a length of the CAZAC sequence, n is an index of an element of the sequence n={0, 1, 2, ..., L−1}, and k is an index of the sequence itself. For a given length L, if L is prime, there are L−1 distinct sequences. Therefore, the entire family of sequences is defined as k ranges in {1, 2, ..., L−1}. However, it should be noted that the CAZAC sequences used for the ACK/NAK and RS transmission need not be generated using the exact above expression as will be further discussed below.

For CAZAC sequences of prime length L, the number of sequences is L−1. As the RBs are assumed to include an even number of sub-carriers, with 1 RB including 12 sub-carriers, the sequences used to transmit the ACK/NAK and RS can be generated, in the frequency or time domain, by either truncating a longer prime length (such as length 13) CAZAC sequence or by extending a shorter prime length (such as length 11) CAZAC sequence by repeating its first element(s) at the end (cyclic extension), although the resulting sequences do not fulfill the technical definition of a CAZAC sequence. Alternatively, CAZAC sequences with even length can be directly generated through a computer search for sequences satisfying the CAZAC properties.

FIG. 3 illustrates a transmitter structure for a CAZAC-based sequence that can be used either as an RS or to carry the ACK/NAK information bits after being modulated by them using BPSK (1 ACK/NAK bit) or QPSK (2 ACK/NAK bits) modulation, as illustrated in FIG. 2. The CAZAC sequence 310 is generated through one of the previously described methods, e.g., modulated for transmission of ACK/NAK bits, un-modulated for RS transmission. Thereafter, it is cyclically shifted 320 as will be subsequently described. The Discrete Fourier Transform (DFT) of the resulting sequence is then obtained 330. The sub-carriers 340 corresponding to the assigned transmission BW are selected 350, and the IFFT is performed 360. Finally, the Cyclic Prefix (CP) 370 and filtering 380 are applied to the transmitted signal. Zero padding is assumed to be inserted by the reference UE in sub-carriers used for the signal transmission by another UE and in guard sub-carriers (not shown). Moreover, for brevity, additional transmitter circuitry such as digital-to-analog converter, analog filters, amplifiers, transmitter antennas, etc., are not illustrated in FIG. 3.

At the receiver, the inverse (complementary) transmitter functions are performed. This is conceptually illustrated in FIG. 4, in which the reverse operations of those in FIG. 3 apply. As it is known in the art (not shown for brevity), an antenna receives the Radio-Frequency (RF) analog signal and, after passing further processing units, such as filters, amplifiers, frequency down-converters, and analog-to-digital converters, the digital received signal 410 passes through a time windowing unit 420 and the CP is removed 430. Subsequently, the receiver unit applies a Fast Fourier Transform (FFT 440), selects 450 the sub-carriers 460 used by the transmitter, applies an Inverse DFT (IDFT) 470, de-multiplexes (in time) the RS or ACK/NAK signal 480, and after obtaining a channel estimate based on the RS (not shown), it extracts the ACK/NAK bits 490. As for the transmitter, well known in the art receiver functionalities such as channel estimation and demodulation are not shown for brevity.

FIG. 5 illustrates an alternative generation method for the transmitted CAZAC sequence is in the frequency domain. The generation of the transmitted CAZAC sequence follows the same steps as in the time domain with two exceptions. The frequency domain version of the CAZAC sequence is used 510, i.e., the DFT of the CAZAC sequence is pre-computed and not included in the transmission chain, and the Cyclic Shift (CS) 550 is applied after the IFFT 540. The selection 520 of the sub-carriers 530 corresponding to the assigned transmission BW, and the application of CP 560 and filtering 570 to the transmitted signal 580, as well as other conventional functionalities (not shown), are as previously described for FIG. 3.

In FIG. 6, the reverse functions are again performed for the reception of the CAZAC-based sequence transmitted as in FIG. 5. The received signal 610 passes through a time windowing unit 620 and the CP is removed 630. Subsequently, the CS is restored 640, an FFT 650 is applied, and the transmitted sub-carriers 660 are selected 665. FIG. 6 also illustrates the subsequent correlation 670 with the replica 680 of the CAZAC-based sequence. Finally, the output 690 is obtained, which can then be passed to a channel estimation unit, such as a time-frequency interpolator, in case of an RS, or can be used to detect the transmitted information when the CAZAC-based sequence is modulated by the ACK/NAK information bits.

Different CSs of the same CAZAC sequence provide orthogonal CAZAC sequences. Therefore, different CSs of the same CAZAC sequence can be allocated to different UEs in the same RB for their RS or ACK/NAK transmission and achieve orthogonal UE multiplexing. This principle is illustrated in FIG. 7.

Referring to FIG. 7, in order for the multiple CAZAC sequences 710, 730, 750, 770 generated correspondingly from multiple CSs 720, 740, 760, 780 of the same root CAZAC sequence to be orthogonal, the CS value 790 should exceed the channel propagation delay spread D (including a time uncertainty error and filter spillover effects). If $T_S$ is the symbol duration, the number of CSs is equal to the mathematical floor of the ratio $T_S/D$. For symbol duration of about 66 microseconds (14 symbols in a 1 millisecond sub-frame), a time separation of about 5.5 microseconds between consecutive CSs results in 12 CS values. If better protection against multipath propagation is needed, only every other (6 of the 12) CS may be used to provide time separation of about 11 microseconds.

Orthogonal multiplexing for the signals from different UEs in the same RB can be achieved not only through different CS values of the CAZAC sequence, as described in FIG. 7, but also through the use of different orthogonal time covers. The ACK/NAK and RS symbols are respectively multiplied with a first and a second orthogonal code. FIG. 8, which is identical to FIG. 2 with the exception of the inclusion of orthogonal time covering, further illustrates this concept.

Referring to FIG. 8, for the ACK/NAK, the orthogonal code is a Walsh-Hadamard (WH) code of length 4 ({+1,−1,−0,−1} 810 is used). For the RS, the orthogonal code is a Fourier code $\{1, e^{j\theta}, e^{j2\theta}\}$ with $$\theta \in \left\{0, \frac{2\pi}{3}, \frac{4\pi}{3}\right\} (\theta = \frac{2\pi}{3}$$

820 is used in FIG. 8) or any other orthogonal code of length 3. The PUCCH multiplexing capacity with the use of orthogonal time covering is increased by a factor of 3 as it is constrained by the smaller length orthogonal code of the RS.

At the receiver the only additional operation needed, relative to the ones described in FIG. 4 and FIG. 6, is the orthogonal time de-covering. For example, for the structure illustrated in FIG. 8, multiplication with the WH code of $\{+1,-1,+1,-1\}$ and the Fourier code of $\{1, e^{-j\theta}, e^{-j2\theta}\}$ with $\theta=2\pi/3$, needs to be performed for the received ACK/NAK and RS symbols, respectively.

PUSCH transmissions can be scheduled by the Node B through an UL Scheduling Assignment (SA) using the Physical DL Control CHannel (PDCCH) or they can be preconfigured. Using the PDCCH, a PUSCH transmission from a UE may generally occur at any sub-frame the Node B scheduler decides. Such PUSCH scheduling is referred to as dynamic. To avoid excessive PDCCH overhead, some PUSCH transmissions may be preconfigured to occur periodically at predetermined parts of the operating BW until re-configured. Such PUSCH transmission scheduling is referred to as semi-persistent.

FIG. 9 illustrates the concept of Semi-Persistent Scheduling (SPS), which is applicable for both DL and UL. SPS is typically used for communication services having relatively small BW requirements per sub-frame but need to be provided for many UEs. One typical example of such services is Voice over Internet Protocol (VoIP) where initial packet transmissions 910 are periodic over predetermined time intervals 920. Due to the large number of UEs potentially transmitting VoIP packets in a sub-frame, dynamic scheduling through the PDCCH highly inefficient and SPS can be used instead.

The Node B transmits the data packets to scheduled UEs through the Physical Downlink Shared CHannel (PDSCH).

Similarly to the PUSCH, the PDSCH can be shared during the same sub-frame by multiple UEs for their packet reception from the same serving Node B, with each UE using a different part of the operating BW in order for mutual interference to be avoided. PDSCH transmissions can also be scheduled by the Node B through the PDCCH (dynamic scheduling) or can be preconfigured (SPS).

As the UL communication is considered, a focus will be on the ACK/NAK signals transmitted by UEs in response to a PDSCH transmission. Because PDSCH scheduling can be dynamic or semi-persistent, the transmission of ACK/NAK signals is respectively dynamic or semi-persistent (periodic). Also, because the periodic ACK/NAK transmissions are predetermined to occur at specific sub-frames, the respective resources (RB, CAZAC sequence CS, orthogonal code) can be also predetermined and semi-persistently assigned to a SPS UE. For dynamic ACK/NAK transmissions, no such pre-assignment is possible and the respective resources need to be dynamically determined in every sub-frame.

Several methods exist for a UE to use for mapping of the resources for its dynamic ACK/NAK transmission. For example, the DL SA may contain a few bits explicitly indicating these resources. Alternatively, implicit mapping based on the PDCCH resources used for the DL SA transmission may apply. The invention will be described using the latter option.

A DL SA includes Control Channel Elements (CCEs). The coding rate applied to the DL SA transmission to a UE depends on the received Signal to Interference and Noise Ratio (SINR) that UE experiences. For example, a high or low coding rate may respectively apply to the DL SA for a UE experiencing a high or low SINR. As the contents of the DL SA are fixed, different coding rates result to different number of CCEs. A DL SA with high coding rate, such as 2/3, may require 1 CCE for its transmission while a DL SA with low coding rate, such as 1/6, may require 4 CCEs for its transmission. It is assumed that the UL resources for the subsequent ACK/NAK transmission are derived by the number of the lowest CCE of the respective DL SA.

FIG. 10 further illustrates the concept of mapping the UL ACK/NAK resources to the lowest CCE number used for the previous DL SA transmission to a reference UE. The DL SA 1 1010 to UE 1 is mapped to 4 CCEs 1011, 1012, 1013, and 1014, the DL SA 2 1020 to UE 2 is mapped to 2 CCEs 1021 and 1022, and the DL SA 3 1030 to UE 3 is mapped to 1 CCE 1031. The resources for the subsequent UL ACK/NAK transmission are determined from the lowest CCE of the respective DL SAs and UE 1 uses resource ACK/NAK (A/N) 1 1040, UE 2 uses resource A/N 5 1044, and UE 3 uses resource A/N 7 1046. The resources A/N 2 1041, A/N 3 1042, A/N 4 1043, and A/N 6 1045 are not used for any dynamic ACK/NAK transmission. The transmission of UL SAs may also be based on the concept of CCE but this is not shown for brevity.

In addition to periodic and dynamic ACK/NAK signals, another periodic control signal a UE may transmit is the Channel Quality Indicator (CQI) informing the serving Node B of the channel conditions the UE experiences in the DL of the communication system, which are typically represented by a SINR. Other periodic control signals include the Service Request (SR) indicating a scheduling need, or the Rank Indicator (RI) indicating support for spatial multiplexing in case the serving Node B has 2 or more transmitter antennas. Therefore, the UL is assumed to support dynamic and semi-persistent PUSCH transmissions, dynamic ACK/NAK transmissions, periodic ACK/NAK transmissions, and other periodic control signals. All control channels are jointly referred to as PUCCH.

ACK/NAK signaling is the fundamental mechanism for a UE and its serving Node B to exchange information about the reception outcome of a prior data packet transmission. Therefore, the ACK/NAK reception reliability, as typically measured by the Bit Error Rate (BER), is essential to the proper operation of the communication system. For example, incorrect interpretation of NAK as ACK causes an incorrectly received packet to not be retransmitted, which in turn may result in a failure of the remaining communication session until the error is corrected by higher layers.

As several UEs may operate under low UL SINRs or be situated in coverage limited locations, the nominal ACK/NAK transmission over one sub-frame may often not be adequate to provide the required reception reliability. For such UEs, it is essential to extend their ACK/NAK transmission periods. A longer transmission period offers more ACK/NAK symbols which can be combined at the Node B receiver to effectively increase the total received SINR.

SUMMARY OF THE INVENTION

Accordingly, the present invention has been designed to solve at least the aforementioned problems occurring in the prior art, and to provide at the advantages described below.

An aspect of the present invention is to provide methods and apparatus for enabling repetitions for the transmission of dynamic or periodic ACK/NAK signals from UEs.

Another aspect of the present invention is to provide methods and apparatus for repeating ACK/NAK transmissions from UEs over multiple sub-frames.

Another aspect of the present invention also is to provide separate mechanisms for repeating dynamic ACK/NAK transmissions and periodic ACK/NAK transmissions.

Another aspect of the present invention is to specify the behavior of a UE with respect to transmissions of other, control or data, signals that may need to occur in the same sub-frames as an ACK/NAK transmission with repetitions.

Another aspect of the present invention is to determine PUCCH resources for the repetitions of the dynamic or periodic ACK/NAK transmissions to avoid interference with other signal transmitted by other UEs to the same serving Node B.

Another aspect of the present invention enables the repetitions of an ACK/NAK transmission by a UE to complete while ensuring well defined and stable system operation.

In accordance with an aspect of the present invention, a method is provided for a User Equipment (UE) to transmit an acknowledgement signal in a communication system. The method includes transmitting the acknowledgement signal in $\{(n+Q)^{th}, (n+Q+1)^{th}, \ldots, (n+Q+N-1)^{th}\}$ Transmission Time Intervals (TTIs), the acknowledgement signal corresponding to a data packet the UE receives in an $n^{th}$ TTI; and not transmitting a non-acknowledgement signal in the $\{(n+Q)^{th}, (n+Q+1)^{th}, \ldots, (n+Q+N-1)^{th}\}$ TTIs. n is an integer, Q is a number greater than 0, and N is a number greater than 1.

In accordance with another aspect of the present invention, an apparatus is provided for transmitting an acknowledgement signal in a communication system. The apparatus includes a receiver configured to receive a data packet in an $n^{th}$ Transmission Time Interval (TTI); and a transmitter configured to transmit the acknowledgement signal in $\{(n+Q)^{th}, (n+Q+1)^{th}, \ldots, (n+Q+N-1)^{th}\}$ TTIs, the acknowledgement signal corresponding to the received data packet, and configured to not transmit a non-acknowledgement signal in the {(n+Q)th, (n+Q+1)th, (n+Q+N−1)th} TTIs. n is an integer, Q is a number greater than 0, and N is a number greater than 1.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE INVENTION

Various embodiments of the present invention will now be described more fully hereinafter with reference to the accompanying drawings. This invention may, however, be embodied in many different forms and should not be construed as limited to the embodiments set forth herein. Rather, these embodiments are provided so that this disclosure will be thorough and complete and will fully convey the scope of the invention to those skilled in the art.

Additionally, although the present invention is described in relation to a Single-Carrier Frequency Division Multiple Access (SC-FDMA) communication system, it also applies to all FDM systems in general and to Orthogonal Frequency Division Multiple Access (OFDMA), OFDM, FDMA, DFT-spread OFDM, Discrete Fourier Transform (DFT)-spread OFDMA, Single-Carrier OFDMA (SC-OFDMA), and SC-OFDM in particular.

System and methods of the embodiments of the present invention are related to the need for a UE to transmit a, dynamic or periodic, ACK/NAK signal over more than one sub-frame (repetition of ACK/NAK signal transmission) without causing interference to the transmission of signals by other UEs to the same serving Node B, and to enable the completion of ACK/NAK signal transmissions over more than one sub-frame while providing a well defined and stable system operation.

Figure 11:
FIG. 11 is a diagram illustrating a partitioning of RBs for CQI, semi-persistent and dynamic ACK/NAK, and semi-persistent and dynamic data signal transmissions.

Several possible partitions exist for the RBs used for dynamic and semi-persistent PUSCH transmissions, for dynamic and periodic ACK/NAK transmissions, and for periodic transmission of CQI or other control signals in the PUCCH. FIG. 11 illustrates an example for such a partition.

Referring to FIG. 11, the RBs for periodic transmissions, such as CQI, 1110A and 1110B, semi-persistent ACK/NAK, 1120A and 1120B, or semi-persistent PUSCH 1130A and 1130B, are located towards the edge of the operating BW to avoid BW fragmentation. They are also located to the exterior of the RBs for dynamic ACK/NAK transmissions, 1140A and 1140B, which are again placed adjacent and to the exterior of the RBs for dynamic PUSCH transmissions 1150A and 1150B.

The reason for the RB partition in FIG. 11 is that the RBs for dynamic ACK/NAK may vary between sub-frames in a non-predetermined manner (the RBs for periodic PUCCH and semi-persistent PUSCH may also vary between sub-frames but this happens in a predetermined manner). Placing the RBs for dynamic ACK/NAK next to the RBs for dynamic PUSCH enables any variation in the number of the former to be incorporated into the latter because the single carrier property of UL signal transmissions requires the allocated RBs to be contiguous. Accordingly, BW fragmentation would occur if the RBs for dynamic ACK/NAK were not located next to the ones for dynamic PUSCH.

The structure in FIG. 11 enables for ACK/NAK repetitions by expanding the ACK/NAK transmission in RBs in the dynamic PUSCH region. For implicit, CCE-based mapping of resources used for dynamic ACK/NAK transmissions, the UEs should know how many RBs are assigned in each sub-frame to the periodic transmissions in order to determine the RB for the first dynamic ACK/NAK transmissions. This information can be provided by the serving Node B through a broadcast channel because the variation of the RBs used for periodic transmissions is over much longer time periods than hundreds of sub-frames.

Repetitions of ACK/NAK transmissions are assumed to be UE-specific, that is, only UEs for which the desired ACK/NAK BER cannot be achieved with transmission over one sub-frame perform additional transmissions of the same ACK/NAK signal over more sub-frames (coverage limited UEs). Implicit mapping of the ACK/NAK resources is assumed and the UE cannot automatically use the same resources in the next sub-frame for the repetition of its ACK/NAK transmission as they may be used by another UE.

For semi-persistent PDSCH scheduling, the Node B knows the ACK/NAK transmission requirements from the semi-persistently scheduled UEs and can configure each such UE to use a distinct set of resources (e.g., orthogonal cover, cyclic shift, and RB) for each repetition.

Figure 10:
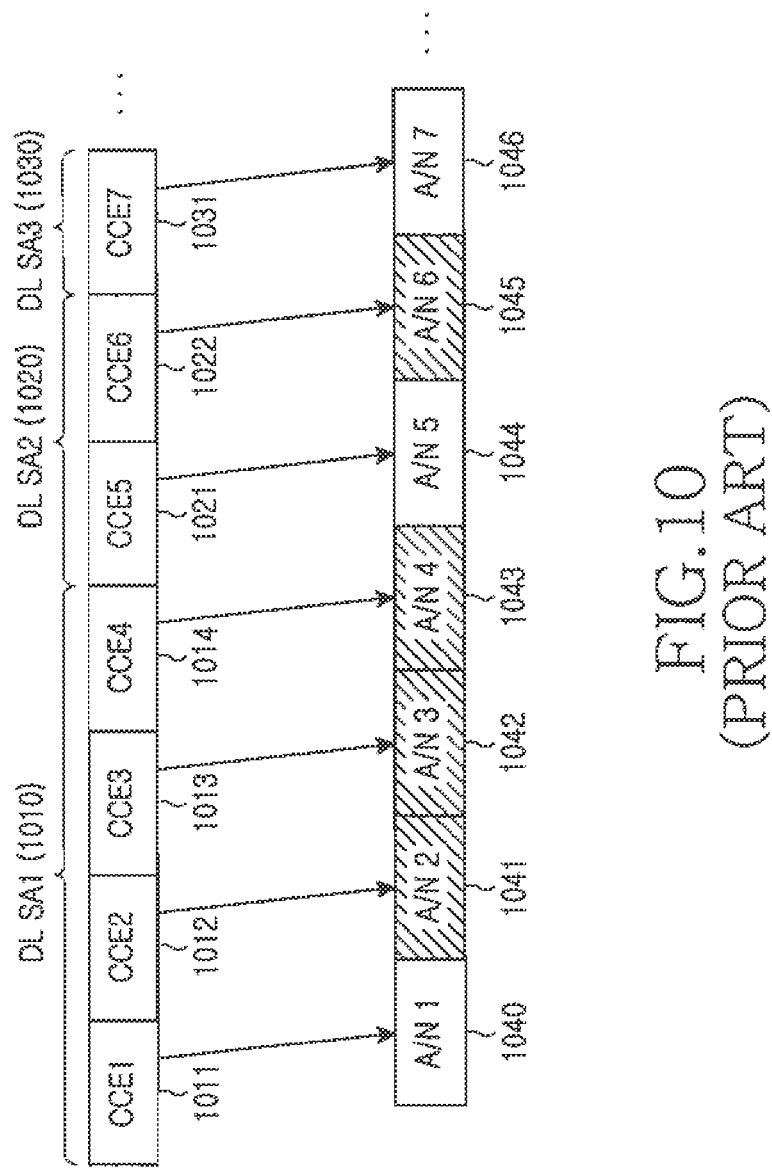
FIG. 10 is a diagram illustrating the mapping between the UL resource used for an ACK/NAK transmission and the control channel element used for the SA for the respective data packet reception.

The remaining of this disclosure concerns the repetitions of ACK/NAK transmissions associated with dynamic PDSCH scheduling. It is assumed that the resources each UE uses for its ACK/NAK transmission are implicitly determined from the associated DL SA as described in FIG. 10.

Figure 12:
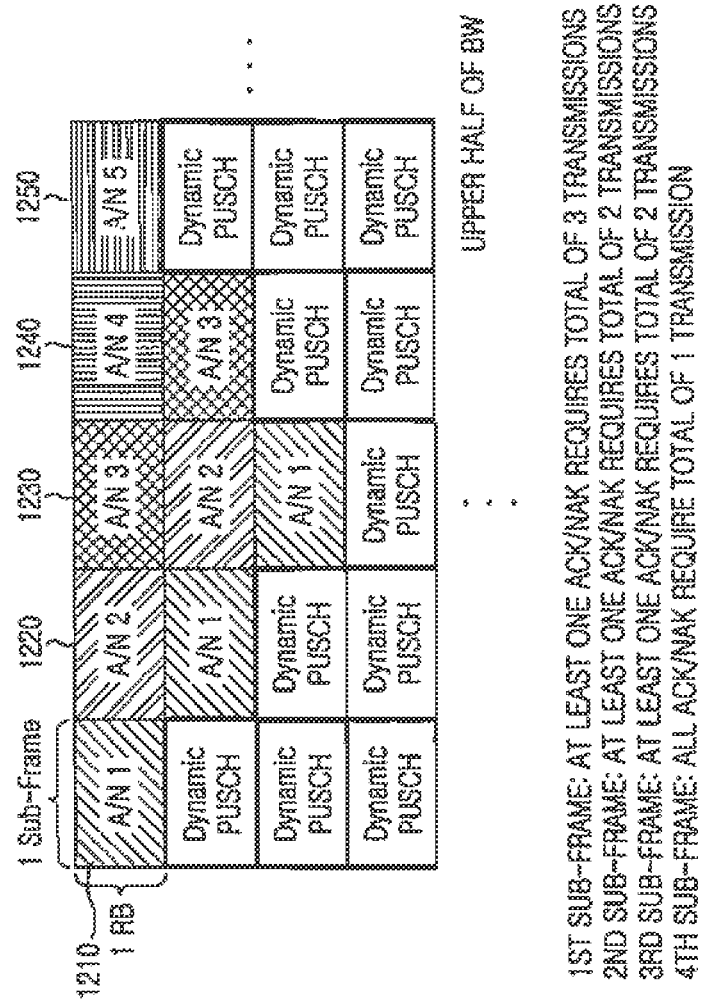
FIG. 12 is a diagram illustrating the use of additional RBs to support repetitions of ACK/NAK transmissions in the respective additional sub-frames.

A first ACK/NAK transmission structure is illustrated in FIG. 12. Only the upper half of the BW is illustrated for simplicity, corresponding to the upper half in FIG. 11, because the same structure applies in the lower part of the BW. For a first ACK/NAK signal, A/N 1 1210, transmission in 2 additional sub-frames is assumed. For a second and third ACK/NAK signals, A/N 2 1220 and A/N 3 1230, transmission over 1 additional sub-frame is assumed. For a fourth and fifth ACK/NAK signals, A/N 4 1240 and A/N 5 1250, no additional transmission beyond the initial sub-frame is assumed. Although the transmission structure illustrated in FIG. 12 shows no particular issues other than the additional RB overhead, this is because of the assumed requirements for the ACK/NAK repetitions.

Figure 13:
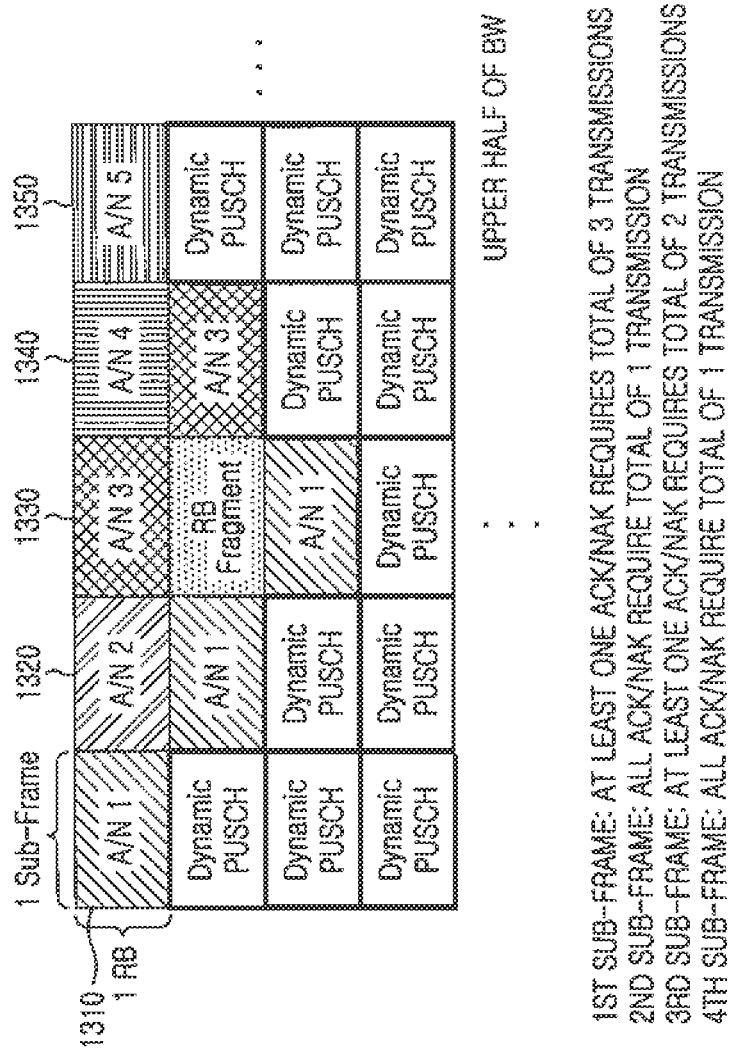
FIG. 13 is a diagram illustrating the BW fragmentation that may occur if a separate RB is used for each repetition of an ACK/NAK transmission.

BW fragmentation can frequently occur if the total number of ACK/NAK transmissions is larger than two as illustrated in FIG. 13. For a first ACK/NAK signal, A/N 1 1310, transmission in 2 additional sub-frames is assumed. For a third ACK/NAK signal, A/N 3 1330, transmission over 1 additional sub-frame is assumed. For a second, fourth, and fifth ACK/NAK signals, A/N 1 1320, A/N 4 1340 and A/N 5 1350, no additional transmission beyond the initial sub-frame is assumed. The number of fragmented RBs can be as large as the maximum number of total ACK/NAK transmissions minus two. For example, for a total of 4 ACK/NAK transmissions, the maximum number of fragmented RBs is 2.

One issue with applying straightforward RB expansion to support ACK/NAK repetitions is the growth in the associated overhead, particularly for the smaller BWs. For example, for an operating BW with 6 RBs, using RB expansion to support 3 or more transmissions of the same ACK/NAK signal leads to 50% or more PUCCH overhead in some sub-frames, which is usually too large. An alternative approach is therefore required.

Figure 1:
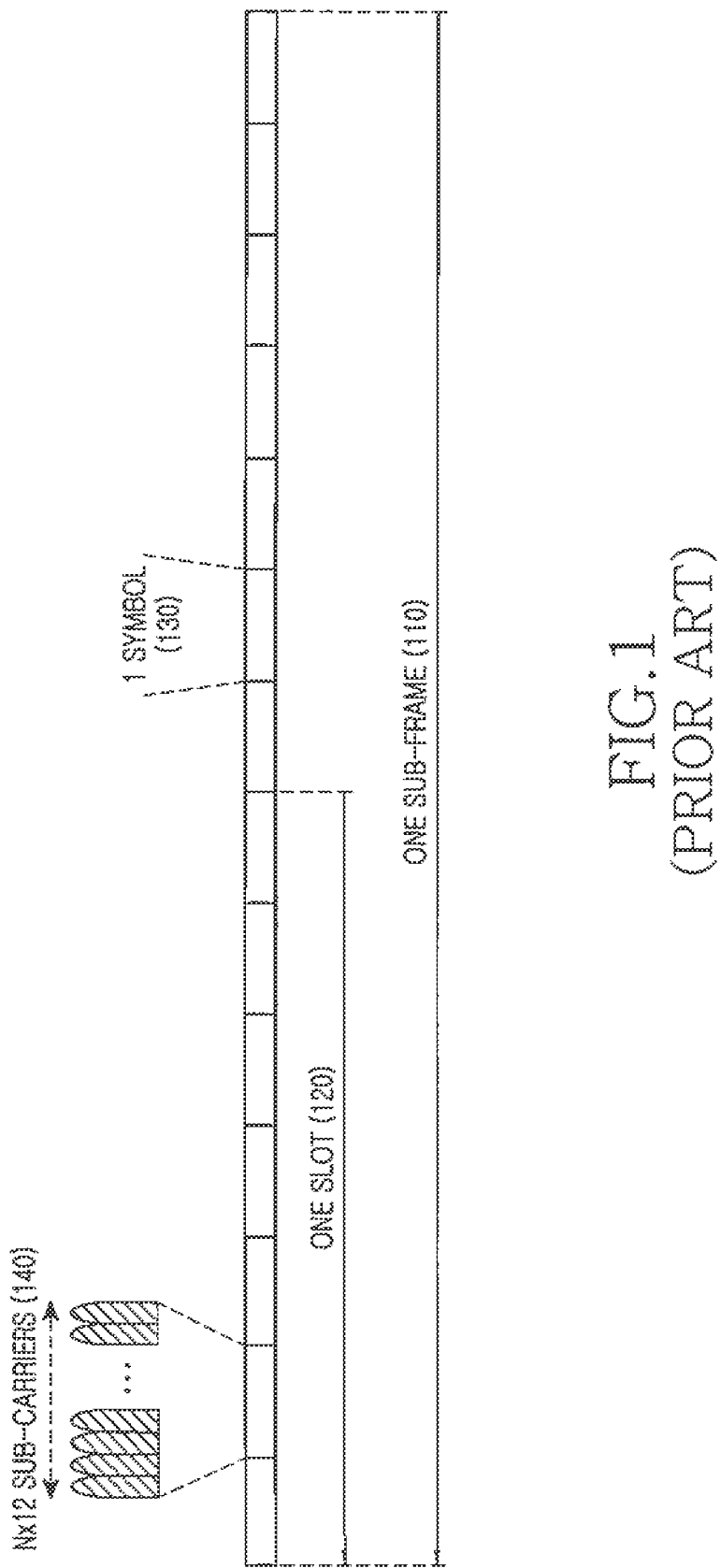
FIG. 1 is a diagram illustrating a slot structure for the SC-FDMA communication system.
Figure 2:
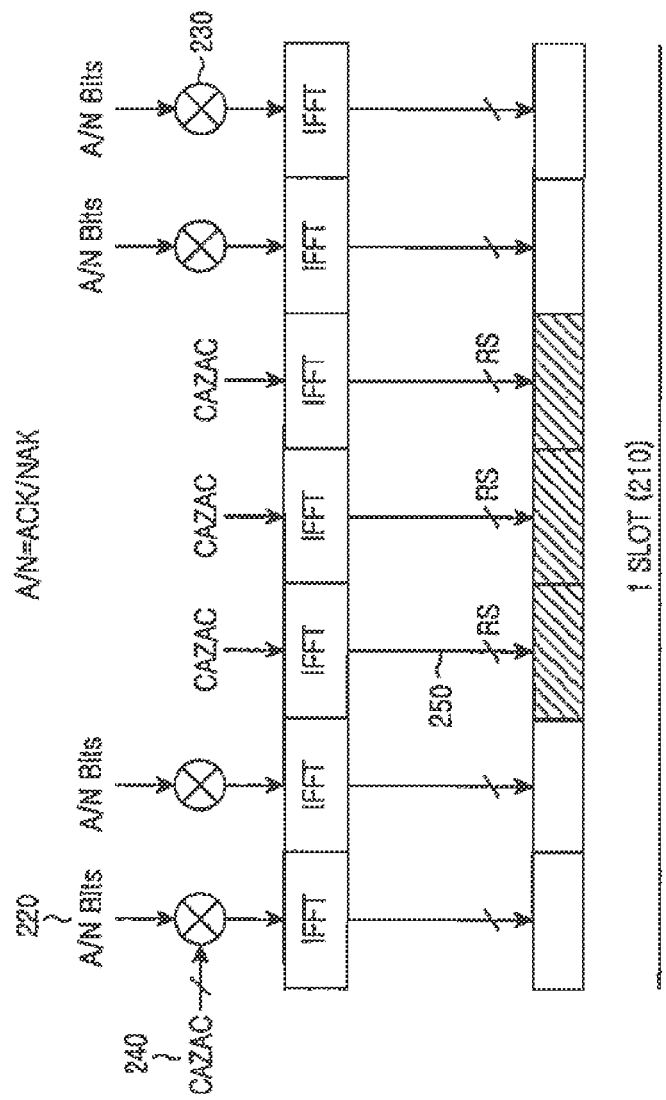
FIG. 2 is a diagram illustrative of a partitioning of a first slot structure for the transmission of ACK/NAK signals and RS.
Figure 3:
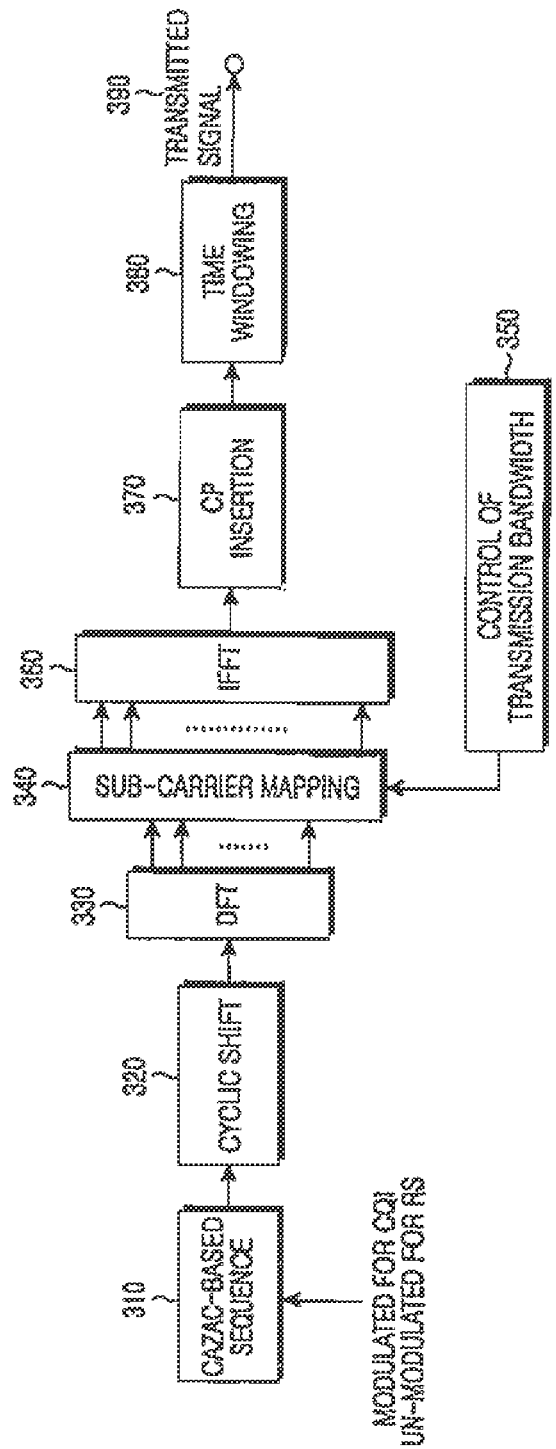
FIG. 3 is a block diagram illustrative of a first SC-FDMA transmitter for transmitting an ACK/NAK signal or a reference signal using a CAZAC-based sequence in the time domain.
Figure 4:
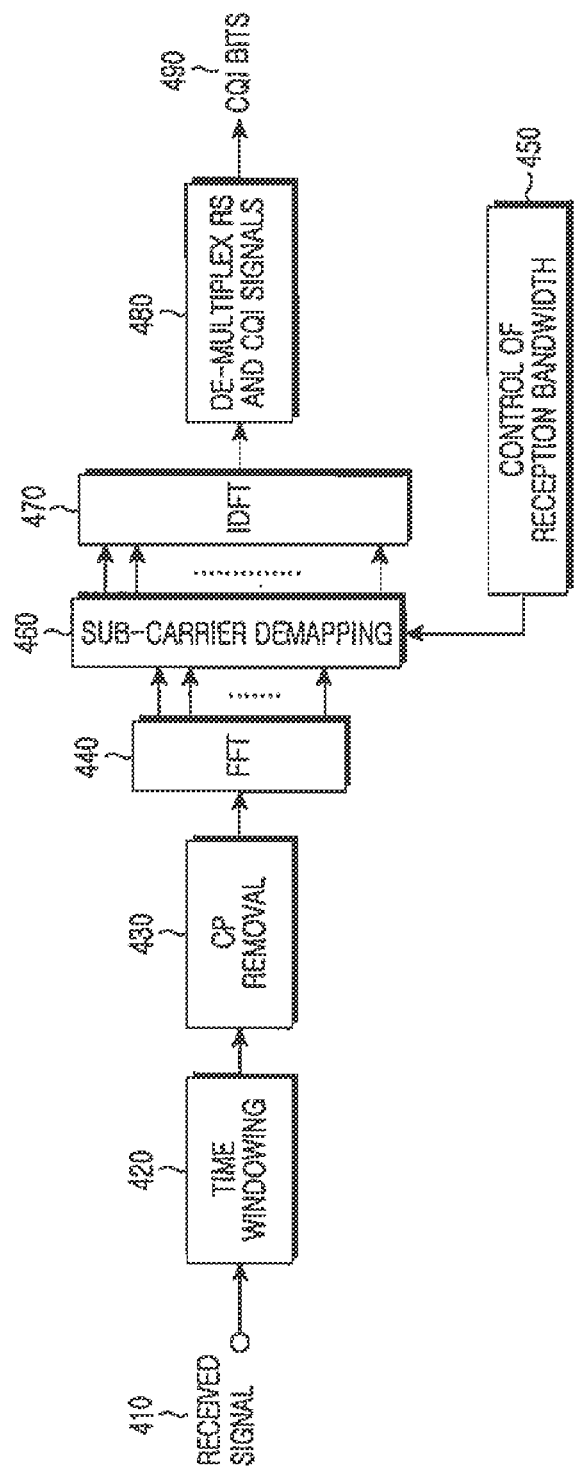
FIG. 4 is a block diagram illustrative of a first SC-FDMA receiver for receiving an ACK/NAK signal or a reference signal using a CAZAC-based sequence in the time domain.
Figure 5:
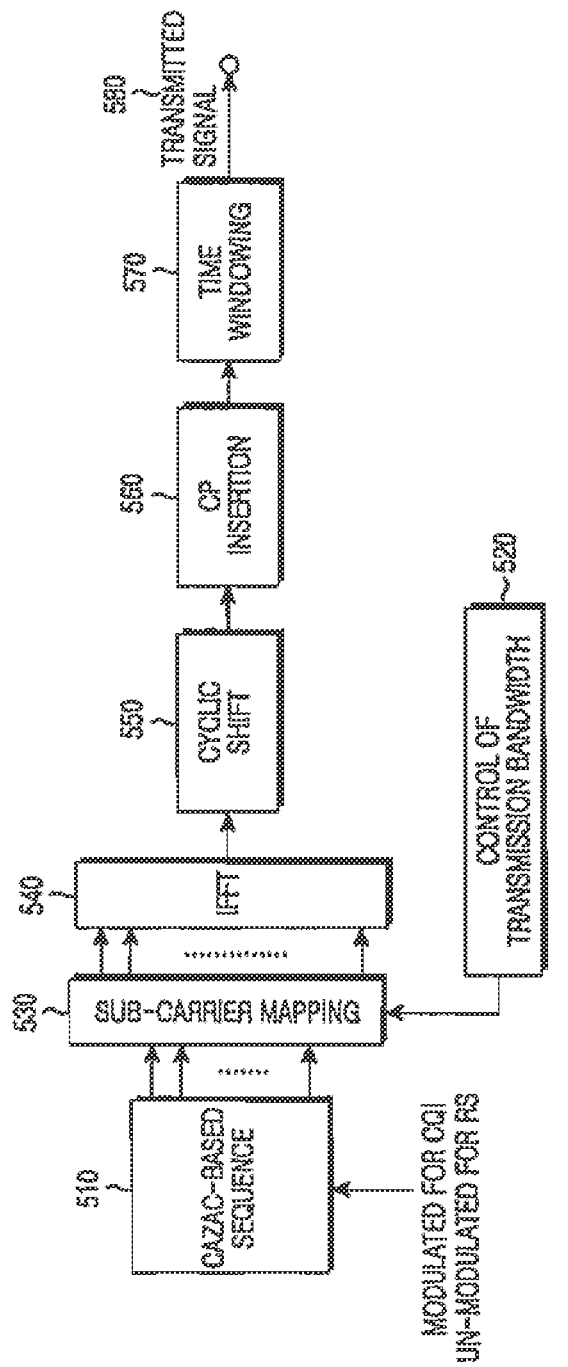
FIG. 5 is a block diagram illustrative of a second SC-FDMA transmitter for transmitting an ACK/NAK signal or a reference signal using a CAZAC-based sequence in the frequency domain.
Figure 6:
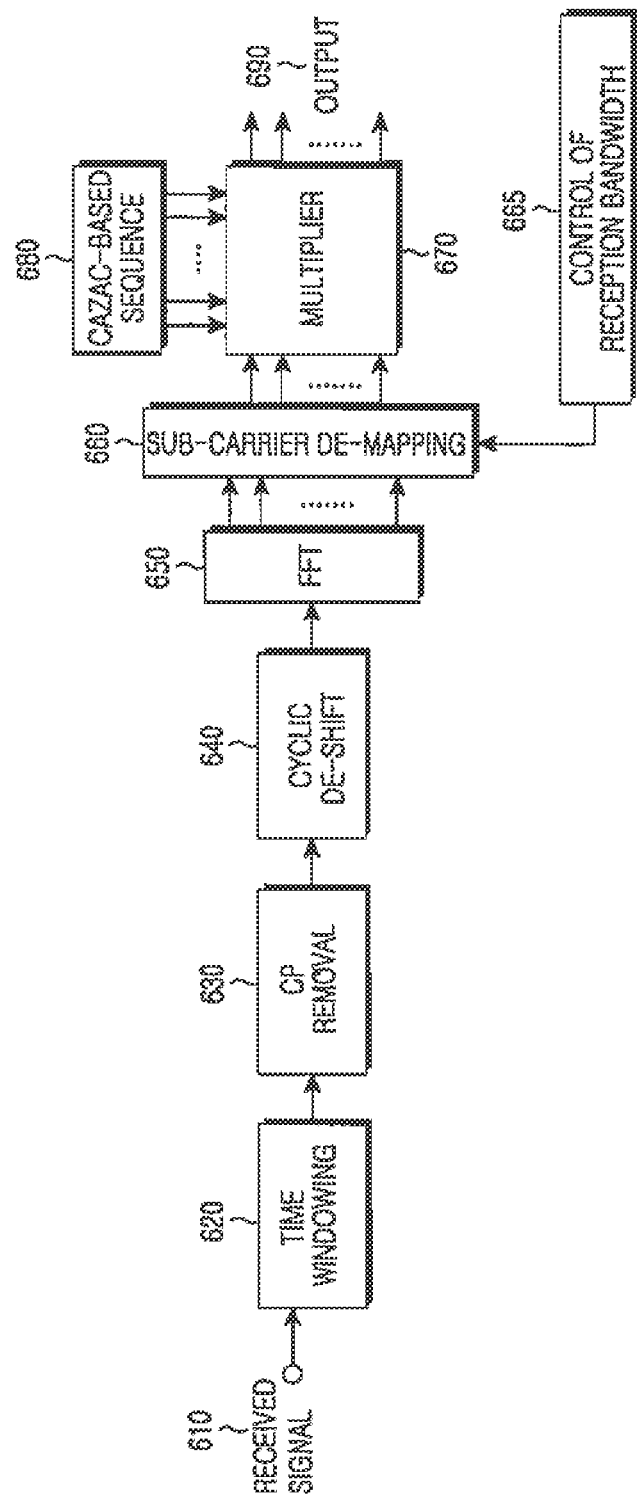
FIG. 6 is a block diagram illustrative of a second SC-FDMA receiver for receiving an ACK/NAK signal or a reference signal using a CAZAC-based sequence in the frequency domain.
Figure 7:
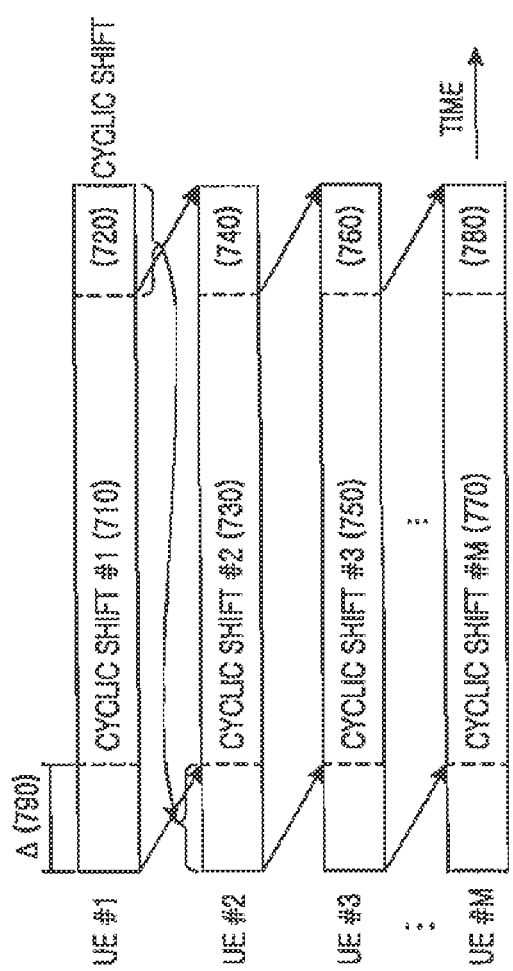
FIG. 7 is a block diagram illustrating a construction of orthogonal CAZAC-based sequences through the application of different cyclic shifts on a root CAZAC-based sequence.
Figure 8:
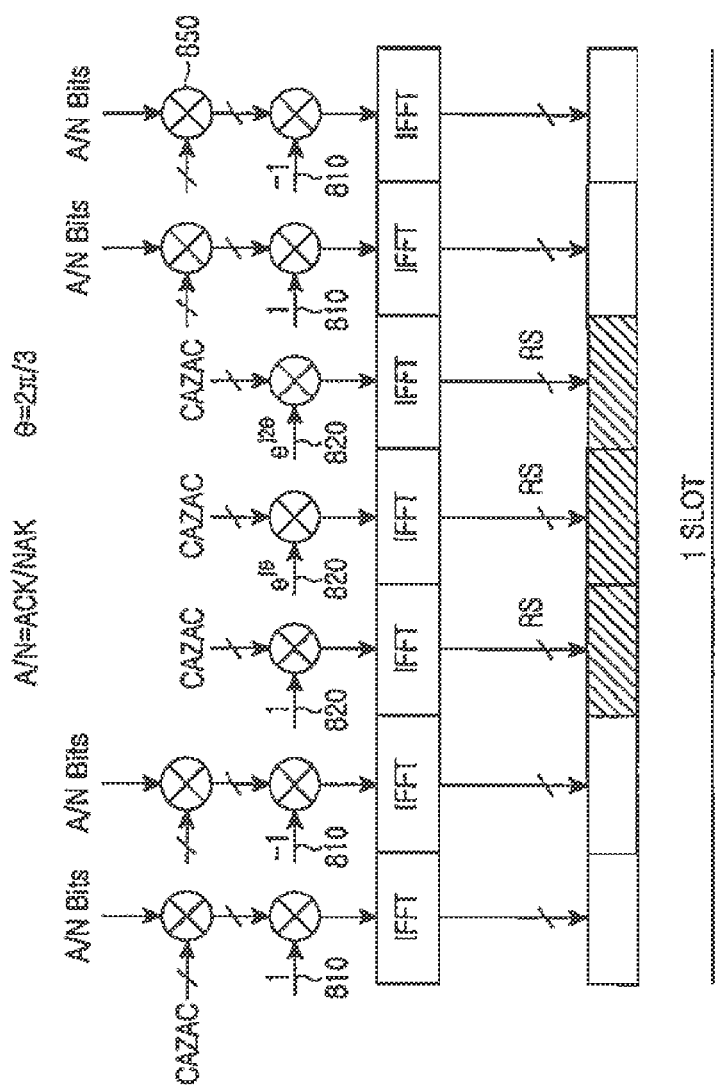
FIG. 8 is a diagram illustrative of applying orthogonal covering to the transmission of an ACK/NAK signal or a reference signal over the slot structure.
Figure 9:
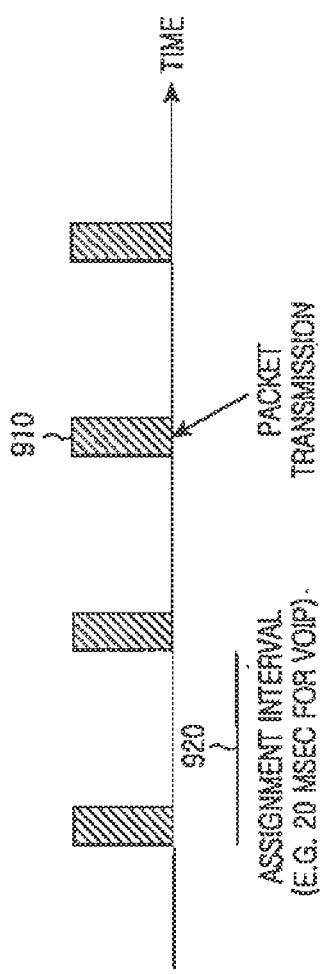
FIG. 9 is a diagram illustrating semi-persistent data packet transmissions.

The implicit mapping of the UL ACK/NAK resources based on the CCEs used for the respective DL SA transmission leads to several unutilized ACK/NAK resources. For example, for an operating BW of 6 RBs, the implicit mapping can consume a maximum of 6 UL ACK/NAK resources. Considering the ACK/NAK multiplexing capacity of the structure illustrated in FIG. 8, the number of ACK/NAK resources is 18 (6 from the CS times 3 from the orthogonal covers) and therefore 12 resources for ACK/NAK transmission remain available after the first transmission. Then, up to two additional repetitions of an ACK/NAK transmission can be accommodated in the same RB by the UE simply adding 6 to the resource number used for its initial ACK/NAK transmission or of its first repetition, if more than one repetition is to be performed.

Figure 14:
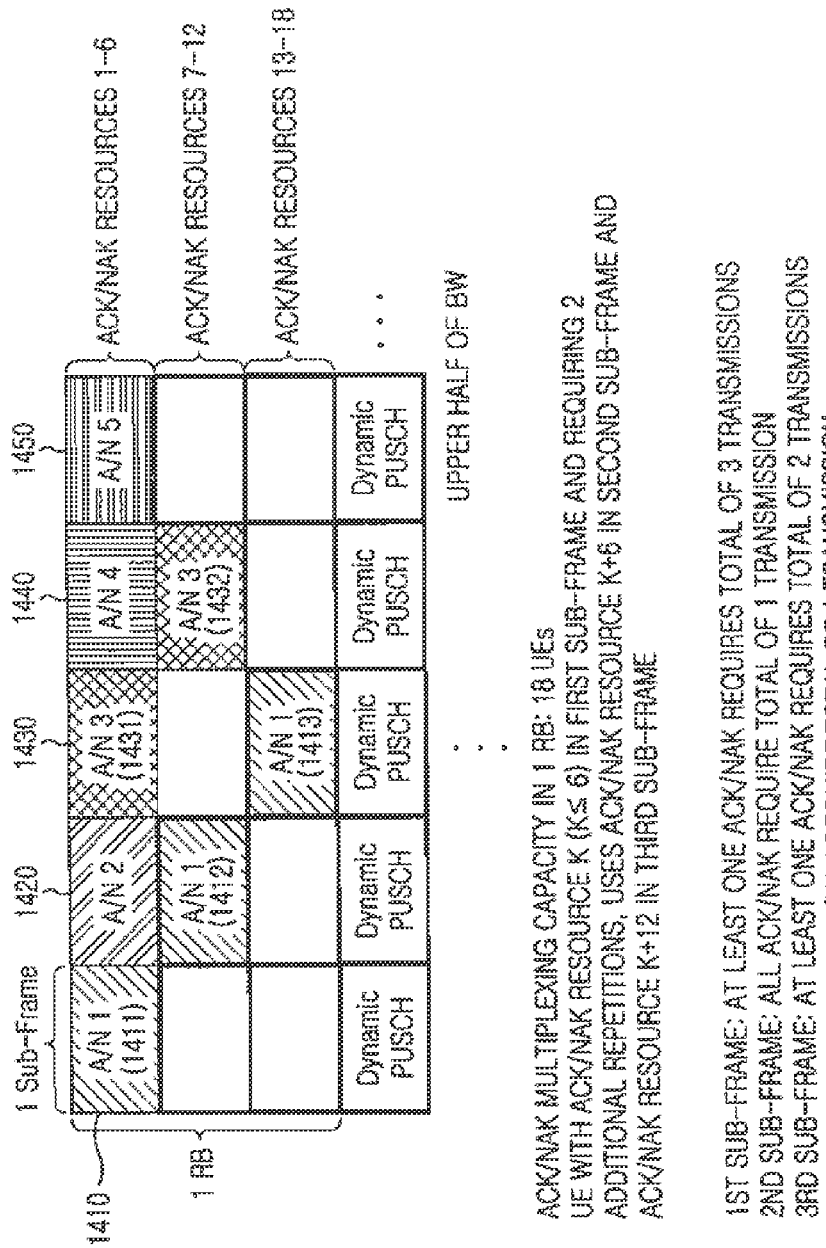
FIG. 14 is a diagram illustrative of confining the ACK/NAK repetitions within the resources in one RB.

The above-mentioned process is illustrated in FIG. 14, which assumes the same conditions as FIG. 13, but now the ACK/NAK repetitions are confined within the same RB as the initial transmission (18 resources for the ACK/NAK transmission are assumed within 1 RB). The ACK/NAK transmission A/N 1 1410 from UE 1 uses the first UL ACK/NAK resource 1411 in a first sub-frame and uses the seventh 1412 and thirteenth 1413 UL ACK/NAK resources for the transmission of the same ACK/NAK signal in a second sub-frame and in a third sub-frame, respectively. The ACK/NAK transmission A/N 3 1430 from UE 3 uses the third UL ACK/NAK resource 1431 in a first sub-frame and uses the ninth 1432 UL ACK/NAK resource for the transmission of the same ACK/NAK signal in a second sub-frame. The ACK/NAK transmissions A/N 2 1420, A/N 4 1440, and A/N 5 1450 are only in one sub-frame (no repetitions).

Using the same RB to multiplex repetitions of ACK/NAK transmissions in subsequent sub-frames in FIG. 14 can extend to any scenario for which the maximum resources required for the first ACK/NAK transmissions in a sub-frame are known in advance to always be fewer than the ACK/NAK multiplexing capacity in one RB. In general, if the initial ACK/NAK transmissions from all UEs require a maximum of M resources while J resources are available in one RB, with M<J, the first repetition of the ACK/NAK transmission from a UE in the next sub-frame may occur in the same RB as the initial one, if the ACK/NAK resource k used by the UE for the initial ACK/NAK transmission in the first sub-frame is such that k≤J−M. Then, the UE uses resource M+k for the repetition of its ACK/NAK transmission in the second sub-frame. The same principles can extend to multiple repetitions.

Another issue related to the ACK/NAK transmission over more than one sub-frame is the subsequent PDSCH scheduling. Assuming either BPSK or QPSK modulation for the ACK/NAK and the same duration for the DL and UL sub-frames, a UE requiring a total of N UL sub-frames for an ACK/NAK transmission can again be scheduled before N−1 DL sub-frames only if it has 1-bit ACK/NAK as there can be no more than 2 ACK/NAK bits in a single transmission (QPSK). The present invention also considers that a UE configured by higher layers to transmit an ACK/NAK signal over N sub-frames (N>1) is implicitly configured a 2-bit ACK/NAK transmission over 2N sub-frames. A 1-bit or a 2-bit ACK/NAK transmission occurs, respectively, when the UE receives a data packet including 1 or 2 codewords.

A UE should not wait before transmitting the second ACK/NAK bit as its resources are implicitly derived per sub-frame from the DL SA. A delayed ACK/NAK transmission may thus interfere with one from another UE. Consequently, even for 1-bit ACK/NAK, only one such transmission can occur during the next N−1 sub-frames because having a UE which is coverage limited for 1-bit ACK/NAK revert to a 2-bit ACK/NAK transmission will simply prolong the number of sub-frames required for the completion of the transmission for both ACK/NAK bits. The total number of required sub-frames will be the same as the one for separate ACK/NAK transmissions. Also, additional resources will be required because the transmission of the second ACK/NAK bit will last longer than a single 1-bit transmission.

Two options exist to address the above issue. The first is to avoid scheduling a UE for the next N−1 DL sub-frames after its last PDSCH scheduling. A UE configured ACK/NAK transmission over N sub-frames (N>1) that receives a DL SA in sub-frame n, and has not received a DL SA in the previous n−N+1 sub-frames (the ones with sub-frame numbers n−1, . . . , n−N+1), does not transmit ACK/NAK signals in response to DL SAs over the next n+N−1 sub-frames (sub-frame numbers n+1, . . . , n+N−1). The second is to enable scheduling of a UE after M DL sub-frames, with M<N, but avoid scheduling the UE for the next 2×(N−M) DL sub-frames.

Regarding transmission in the PUSCH of an ACK/NAK signal requiring transmission over more than one sub-frame in the PUCCH, the respective BER should be considered. Given that ACK/NAK transmission in the PUSCH shares the allocated resources with other signals, such as the data signal or possible periodic control signals (such as CQI), the ACK/NAK BER in the PUSCH can become substantially worse than the PUCCH one. Therefore, having ACK/NAK transmission in the PUSCH only prolongs the completion of that ACK/NAK transmission and increases the latency of the communication. This also complicates management of the ACK/NAK resources and may lead to increased overhead requirements to support ACK/NAK repetition. Moreover, the performance of data or other control signals in the PUSCH is degraded.

To avoid the above complications and maintain a simple solution for supporting ACK/NAK repetitions, a UE requiring ACK/NAK repetitions should not have any PUSCH transmissions before it completes an ACK/NAK one. For example, the UE may not attempt detection of SAs leading to such PUSCH transmissions or may ignore such SAs if it detects them. Therefore, a UE configured to transmit an ACK/NAK signal over N sub-frames (N>1), and receives a DL SA in sub-frame n, and has not received a DL SA in the previous n−N+1 sub-frames (the ones with sub-frame numbers n−1, . . . , n−N+1), should not transmit in PUSCH during the sub-frames over which it transmits the ACK/NAK signal in response to the DL SA received in sub-frame n.

Following the same reasoning as above, a UE configured ACK/NAK repetitions should not transmit CQI or RI signals whenever it transmits ACK/NAK (in the PUCCH). It should be noted that without repetitions of the ACK/NAK transmission in multiple sub-frames, none of the previous restrictions related to any of the aforementioned signal transmissions applies.

Figure 15:
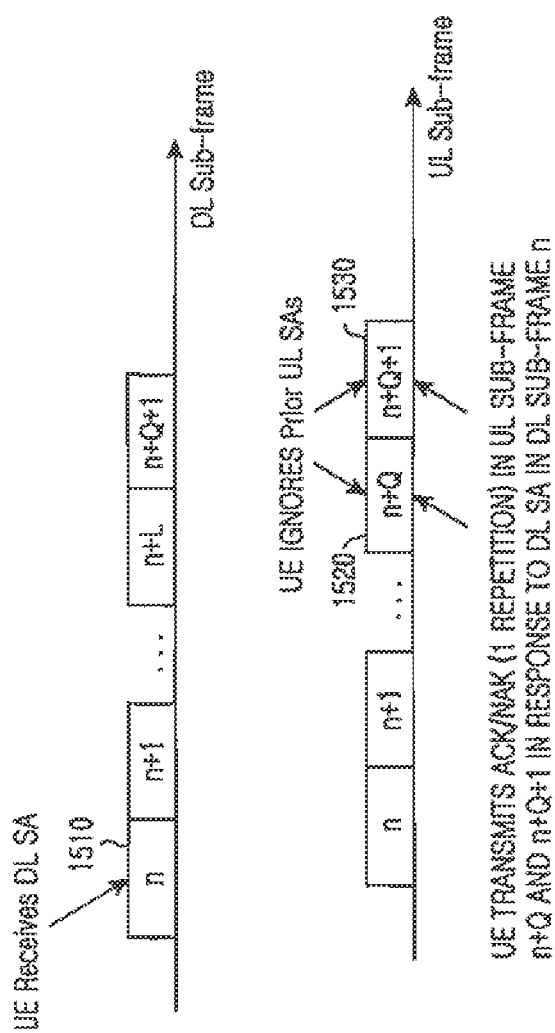
FIG. 15 is a diagram illustrative of a UE suspending transmission of other data or control signals during the sub-frames where an ACK/NAK transmission is repeated.

FIG. 15 illustrates the above concepts for when the UE does not transmit in the PUSCH (for example, by either ignoring or by not responding to UL SAs) and requires one repetition for its ACK/NAK transmission. The concept can be easily generalized to more than one repetition.

Referring to FIG. 15, after the UE receives a DL SA in sub-frame n 1510, it transmits the respective ACK/NAK (and one repetition) in UL sub-frames n+Q 1520 and n+Q+1 1530. During these UL sub-frames, the UE is not responsive to any previous UL SA resulting to PUSCH transmission (or to transmission in any UL channel) and transmits only the ACK/NAK signal until it completes the pre-determined number of repetitions.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method for transmitting a first acknowledgement signal corresponding to a first data packet by a user equipment (UE) in a communication system, the method comprising:

transmitting the first acknowledgement signal in {(n+Q)th, (n+Q+1)th, . . . , (n+Q+N−1)th} transmission time intervals (TTIs), wherein the first acknowledgement signal corresponds to the first data packet received by the UE in an nth TTI, wherein a transmission of an other signal excluding the first acknowledgement signal in the {(n+Q)th, (n+Q+1)th, . . . , (n+Q+N−1)th} TTIs is prohibited, wherein n is an integer, Q is a number greater than 0, and N is a number greater than 1, wherein a transmission of second acknowledgement signals corresponding to second data packets received in {(n+1)th, (n+2)th, . . . , (n+N−1)th} TTIs is prohibited.

2. The method of claim 1, wherein the other signal comprises an uplink data packet.

3. The method of claim 1, wherein the other signal comprises control information.

4. The method of claim 3, wherein the control information comprises at least one of a channel quality indication, a rank indicator, and a scheduling request.

5. The method of claim 1, wherein the first data packet is received according to a scheduling assignment.

6. The method of claim 1, wherein the first data packet is received according to a periodic transmission schedule.

7. An apparatus for transmitting a first acknowledgement signal corresponding to a first data packet in a communication system, the apparatus comprising:

a transceiver configured to transmit or receive data; and a processor configured to transmit the first acknowledgement signal in {(n+Q)th, (n+Q+1)th, . . . , (n+Q+N−1)th} TTIs, wherein the first acknowledgement signal corresponds to the first data packet received by a user equipment (UE) in an nth TTI, wherein a transmission of other signal excluding the first acknowledgement signal in the {(n+Q)th, (n+Q+1)th, . . . , (n+Q+N−1)th} TTIs is prohibited, wherein n is an integer, Q is a number greater than 0, and N is a number greater than 1, wherein a transmission of second acknowledgement signals corresponding to second data packets received in {(n+1)th, (n+2)th, . . . , (n+N−1)th} TTIs is prohibited.

8. The apparatus of claim 7, wherein the other signal comprises an uplink data packet.

9. The apparatus of claim 7, wherein the other signal comprises control information.

10. The apparatus of claim 9, wherein the control information comprises at least one of:

a channel quality indication;

a rank indicator; and a scheduling request.

11. The apparatus of claim 7, wherein the first data packet is received according to a scheduling assignment.

12. The apparatus of claim 7, wherein the first data packet is received according to a periodic transmission schedule.

13. The method of claim 1, wherein the UE does not receive the first data packet in {(n−1)th, (n−2)th, . . . , (n−N+1)th} TTIs.

14. The apparatus of claim 7, wherein the processor does not receive the first data packet in {(n−1)th, (n−2)th, . . . , (n−N+1)th} TTIs.

* * * * *